United States Patent
Stevens et al.

(10) Patent No.: US 10,393,024 B2
(45) Date of Patent: Aug. 27, 2019

(54) MULTI-AIR STREAM COOLING SYSTEM

(71) Applicant: UNITED TECHNOLOGIES CORPORATION, Farmington, CT (US)

(72) Inventors: Michael S. Stevens, Alfred, ME (US); Brian C. McLaughlin, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 485 days.

(21) Appl. No.: 15/250,304

(22) Filed: Aug. 29, 2016

(65) Prior Publication Data

US 2018/0058329 A1    Mar. 1, 2018

(51) Int. Cl.
*F02C 7/18* (2006.01)
*F04D 29/54* (2006.01)
*F01D 5/08* (2006.01)

(52) U.S. Cl.
CPC ............ *F02C 7/18* (2013.01); *F01D 5/082* (2013.01); *F04D 29/54* (2013.01); *Y02T 50/676* (2013.01)

(58) Field of Classification Search
CPC .......... F01D 25/08; F01D 25/12; F01D 25/14; F01D 25/24; F01D 25/26; F01D 9/065; F02C 7/12; F02C 7/18; F02C 7/185
See application file for complete search history.

(56) References Cited

U.S. PATENT DOCUMENTS

| | | | | |
|---|---|---|---|---|
| 4,425,079 A * | 1/1984 | Speak | ..................... | F01D 5/081 415/115 |
| 5,252,026 A * | 10/1993 | Shepherd | ................ | F01D 5/081 415/115 |
| 6,050,079 A * | 4/2000 | Durgin | .................... | F01D 5/082 415/115 |
| 7,225,624 B2 * | 6/2007 | Ress, Jr. | ................. | F01D 5/082 60/782 |
| 7,870,742 B2 * | 1/2011 | Lee | ......................... | F01D 5/082 60/782 |

(Continued)

FOREIGN PATENT DOCUMENTS

| EP | 2843191 A1 | 3/2015 |
|---|---|---|
| FR | 2883926 A1 | 10/2006 |

OTHER PUBLICATIONS

Extended European Search Report dated Dec. 18, 2017 in European Application No. 17178440.8.

*Primary Examiner* — Kenneth Bomberg
*Assistant Examiner* — Jose M Siguenza, Jr.
(74) *Attorney, Agent, or Firm* — Snell & Wilmer, L.L.P.

(57) ABSTRACT

A multi-air stream cooling system is provided. The multi-air stream cooling system may comprise an inner vane support, a flow guide, and a fastened inner duct. The inner vane support may partially define a first airflow path. The flow guide may couple to the inner vane support and may partially define a second airflow path. The fastened inner duct may couple to the flow guide and may partially define a third airflow path. The inner vane support may comprise a discharge slot to allow a first airflow into a blade rim cavity. The flow guide may comprise a tangential onboard injector (TOBI) to provide a second airflow through a cover plate. The flow guide may also comprise a bypass passage configured to enable a third airflow from the third airflow path.

17 Claims, 6 Drawing Sheets

(56) References Cited

U.S. PATENT DOCUMENTS

| | | | | |
|---|---|---|---|---|
| 8,029,238 B2 * | 10/2011 | Argaud | .................. | F01D 5/046 |
| | | | | 415/211.1 |
| 8,336,317 B2 * | 12/2012 | Blanchard | ............... | F01D 5/082 |
| | | | | 60/806 |
| 8,850,828 B2 * | 10/2014 | Mongillo, Jr. | .......... | F01D 5/186 |
| | | | | 60/806 |
| 2011/0283711 A1 * | 11/2011 | Petersson | ................ | F01D 9/041 |
| | | | | 60/796 |

* cited by examiner

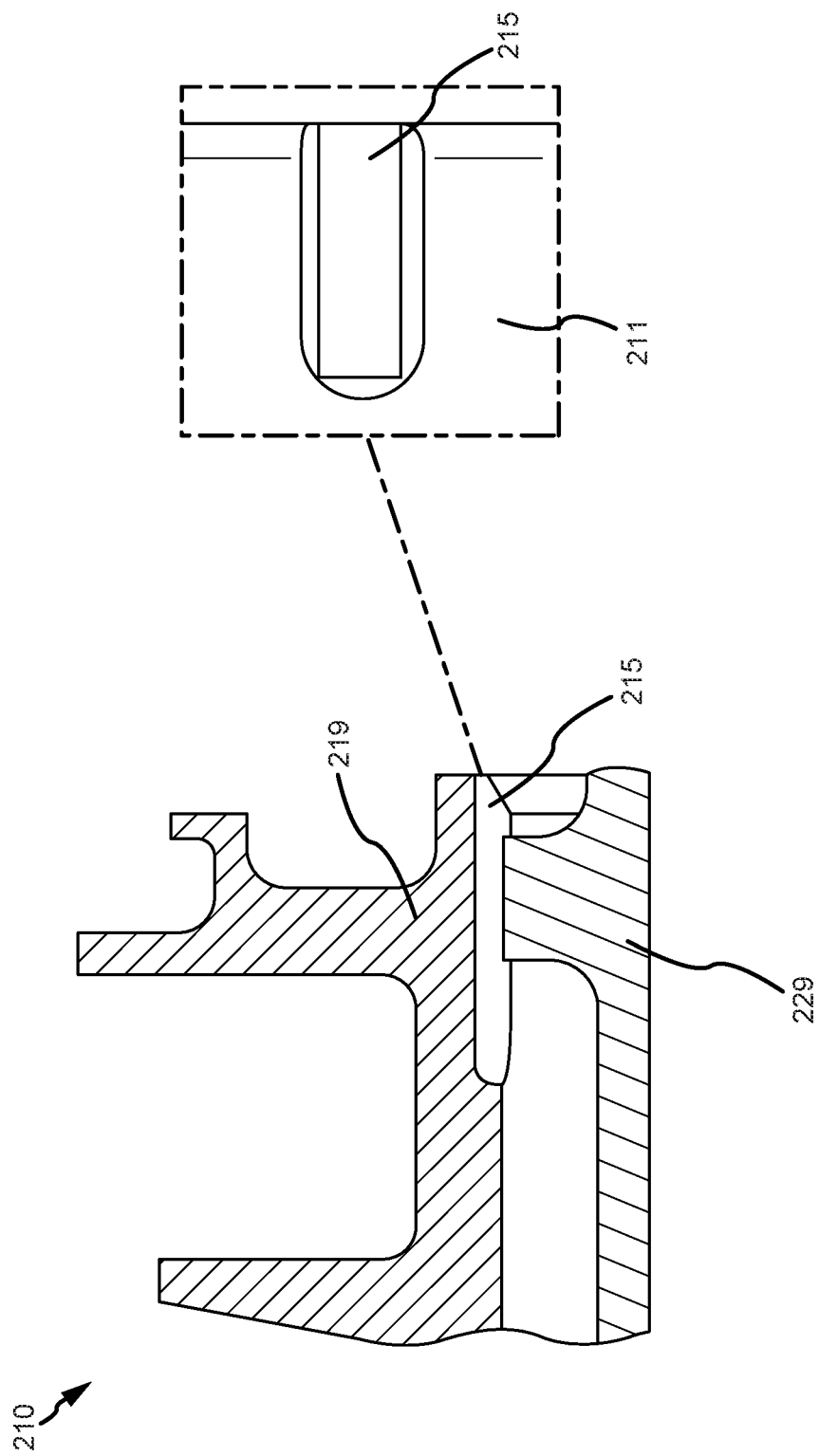

MULTI-AIR STREAM COOLING SYSTEM

STATEMENT REGARDING GOVERNMENT RIGHTS

This disclosure was made with government support under FA8650-09-2923-0021 awarded by the United States Air Force. The government has certain rights in the disclosure.

FIELD

The present disclosure relates to gas turbine engines, and more specifically, to a multi-air stream cooling system for gas turbine engines.

BACKGROUND

Gas turbine engines often operate at high temperatures. Combustors and turbines in particular may be exposed to harsh thermal environments. As engine efficiency and power increases, internal temperatures may rise. As a result, gas turbine engines may depend on a cooling airflow to protect components and ensure longevity. Typically, combustor bypass air used as a cooling air may flow along a single airflow path to cool rotating blades, stator vanes, and/or other engine components. The cooling air may rise in temperature due to the location of the airflow path being in close proximity to the combustor chamber. Thus, providing a cooling airflow without increasing the airflow temperature may increase engine efficiency and component durability.

SUMMARY

In various embodiments, a cooling system is disclosed. The cooling system may comprise an inner vane support having a first surface radially opposite a second surface. The cooling system may comprise a flow guide coupled to the second surface of the inner vane support, wherein the flow guide comprises an outer surface radially opposite an inner surface. The cooling system may comprise a fastened inner duct coupled to the inner surface of the flow guide, wherein the fastened inner duct comprises a third surface radially opposite a fourth surface. The first surface of the inner vane support may partially define a first airflow path through the cooling system. The second surface of the inner vane support and the outer surface of the flow guide may define a second airflow path through the cooling system. The inner surface of the flow guide and the third surface of the fastened inner duct may define a third airflow path through the cooling system.

In various embodiments, the cooling system may further comprise a discharge slot located on the second surface of the inner vane support, proximate to a coupling of the inner vane support to the flow guide. The cooling system may further comprise a bypass passage located on the inner surface of the flow guide, wherein the bypass passage is bounded by the outer surface and the inner surface of the flow guide and is configured to receive a third airflow from the third airflow path. The cooling system may further comprise a tangential onboard injector (TOBI) located at an aft end of the flow guide, wherein the TOBI is configured to receive a second airflow from the second airflow path. The flow guide may comprise a TOBI inlet on the outer surface forward of the TOBI configured to enable the second airflow to flow through the TOBI, wherein the TOBI inlet is bounded by the outer surface and the TOBI. The cooling system may further comprise a stopping rib located on the third surface of the fastened inner duct. The cooling system may further comprise a stiffening rib located on the third surface of the fastened inner duct, aft of the stopping rib.

In various embodiments, a gas turbine engine is disclosed. The gas turbine engine may comprise a compressor; a combustor in fluid communication with the compressor; a turbine in fluid communication with the combustor; a diffuser around the combustor; and a cooling system coupled to an inner diffuser case of the diffuser. The cooling system may comprise an inner vane support having a first surface radially opposite a second surface. The cooling system may comprise a flow guide coupled to the second surface of the inner vane support, wherein the flow guide comprises an outer surface radially opposite an inner surface. The cooling system may comprise a fastened inner duct coupled to the inner surface of the flow guide, wherein the fastened inner duct comprises a third surface radially opposite a fourth surface. The first surface of the inner vane support may partially define a first airflow path through the cooling system. The second surface of the inner vane support and the outer surface of the flow guide may define a second airflow path through the cooling system. The inner surface of the flow guide and the third surface of the fastened inner duct may define a third airflow path through the cooling system.

In various embodiments, the gas turbine engine may further comprise a discharge slot located on the second surface of the inner vane support, proximate to a coupling of the inner vane support to the flow guide. The gas turbine engine may further comprise a bypass passage located on the inner surface of the flow guide, wherein the bypass passage is bounded by the outer surface and the inner surface of the flow guide and is configured to receive a third airflow from the third airflow path. The gas turbine engine may further comprise a tangential onboard injector (TOBI) located at an aft end of the flow guide, wherein the TOBI is configured to receive a second airflow from the second airflow path. The flow guide may comprise a TOBI inlet on the outer surface forward of the TOBI configured to enable the second airflow to flow through the TOBI, wherein the TOBI inlet is bounded by the outer surface and the TOBI. The gas turbine engine may further comprise a stopping rib located on the third surface of the fastened inner duct. The gas turbine engine may further comprise a stiffening rib located on the third surface of the fastened inner duct, aft of the stopping rib.

In various embodiments, a diffuser is disclosed. The diffuser may comprise an inner diffuser case and a cooling system coupled to the inner diffuser case. The cooling system may comprise an inner vane support having a first surface radially opposite a second surface. The cooling system may comprise a flow guide coupled to the second surface of the inner vane support, wherein the flow guide comprises an outer surface radially opposite an inner surface. The cooling system may comprise a fastened inner duct coupled to the inner surface of the flow guide, wherein the fastened inner duct comprises a third surface radially opposite a fourth surface. The first surface of the inner vane support and the inner diffuser case may define a first airflow path through the cooling system. The second surface of the inner vane support and the outer surface of the flow guide may define a second airflow path through the cooling system. The inner surface of the flow guide and the third surface of the fastened inner duct may define a third airflow path through the cooling system.

In various embodiments, the diffuser may further comprise a discharge slot located on the second surface of the inner vane support, proximate to a coupling of the inner vane support to the flow guide. The diffuser may further comprise a bypass passage located on the inner surface of the flow guide, wherein the bypass passage is bounded by the outer surface and the inner surface of the flow guide and is configured to receive a third airflow from the third airflow path. The diffuser may further comprise a tangential onboard injector (TOBI) located at an aft end of the flow guide, wherein the TOBI is configured to receive a second airflow from the second airflow path. The flow guide may comprise a TOBI inlet on the outer surface forward of the TOBI configured to enable the second airflow to flow through the TOBI, wherein the TOBI inlet is bounded by the outer surface and the TOBI. The diffuser may further comprise a stopping rib located on the third surface of the fastened inner duct. The diffuser may further comprise a stiffening rib located on the third surface of the fastened inner duct, aft of the stopping rib.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 4B illustrates a cross-section view of the inner vane support, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
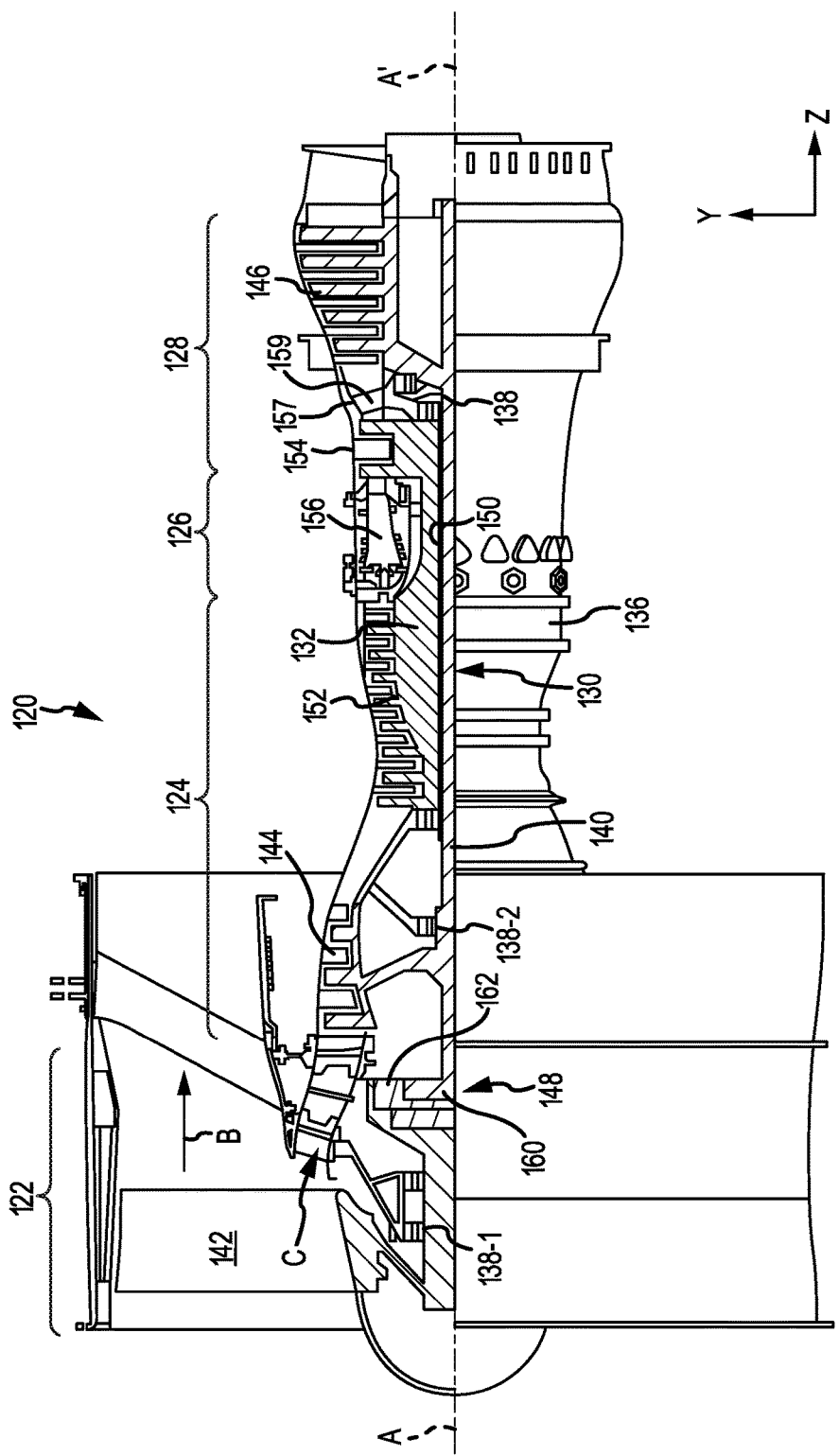
FIG. 1 illustrates a cross-section view of a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2:
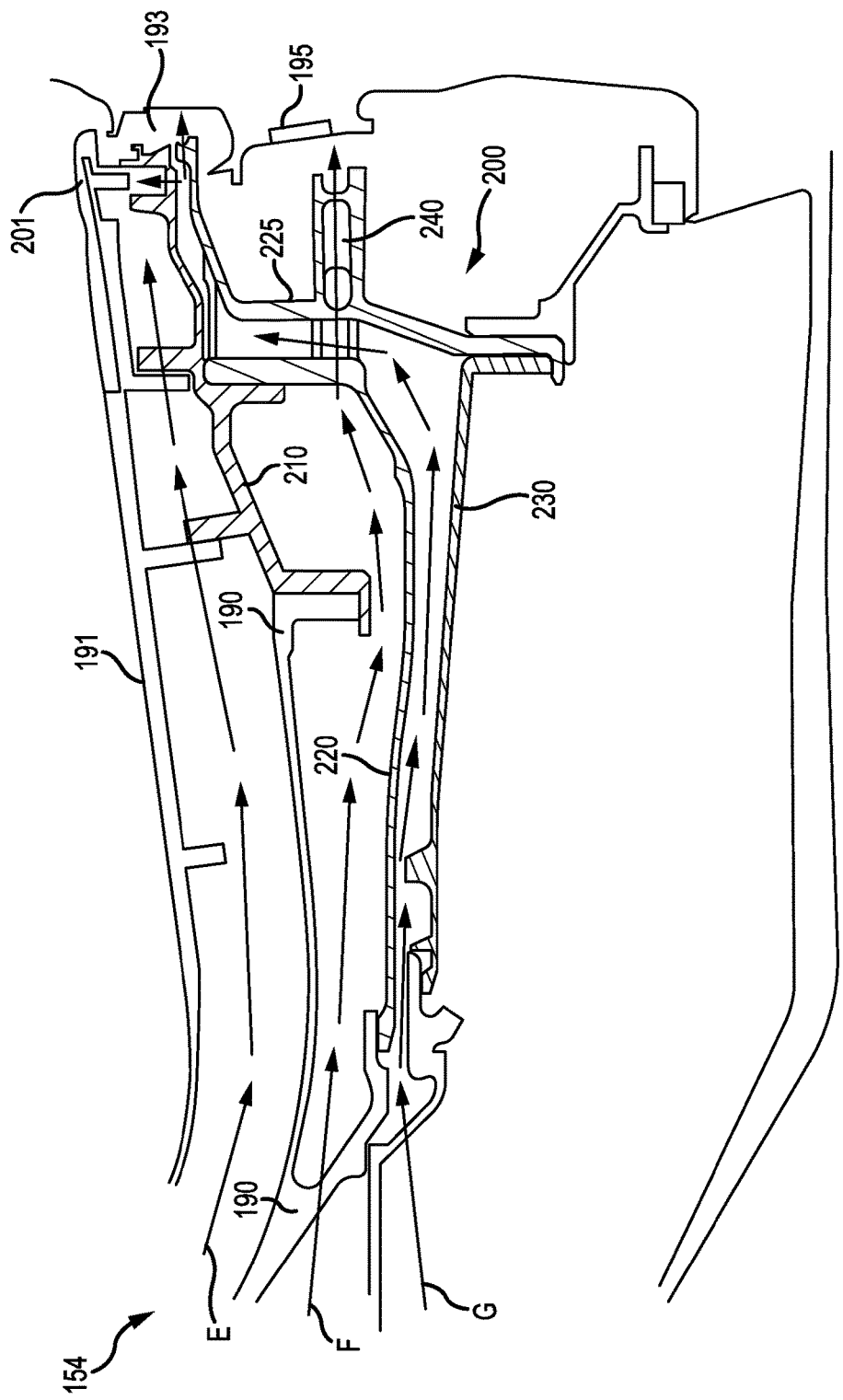
FIG. 2 illustrates a cross-section view of a high pressure turbine section, in accordance with various embodiments.

In various embodiments, and with reference to FIG. 2, a cooling system 200 is disclosed. Cooling system 200 may be located in any suitable position within gas turbine engine 120. For example, cooling system 200 may be located within high pressure turbine section 154. In that regard, cooling system 200 may couple to an inner diffuser case 190 in combustor section 156. Cooling system 200 may comprise an inner vane support 210, a flow guide 220, and/or a fastened inner duct 230.

In various embodiments, cooling system 200 may be configured to provide multiple airstreams through gas turbine engine 120. In that regard, inner vane support 210, flow guide 220, and fastened inner duct 230 may define the multiple airstreams in cooling system 200. In various embodiments, cooling system 200 may provide a first airflow path E, a second airflow path F, and/or a third airflow path G. By providing multiple airstreams through gas turbine engine 120, cooling system 200 may enable a cooler supply of airflow to rotors, blades, and/or other engine components. Typical TOBI cooling systems comprise a single airflow path to deliver cool air to engine components. Having multiple airflow paths may enable the thermal separation of each respective airflow, such that airflows having different temperatures and/or volumetric flow rates (volume per unit of time) may be separated and provided to different sections of gas turbine engine 120.

Figure 3:
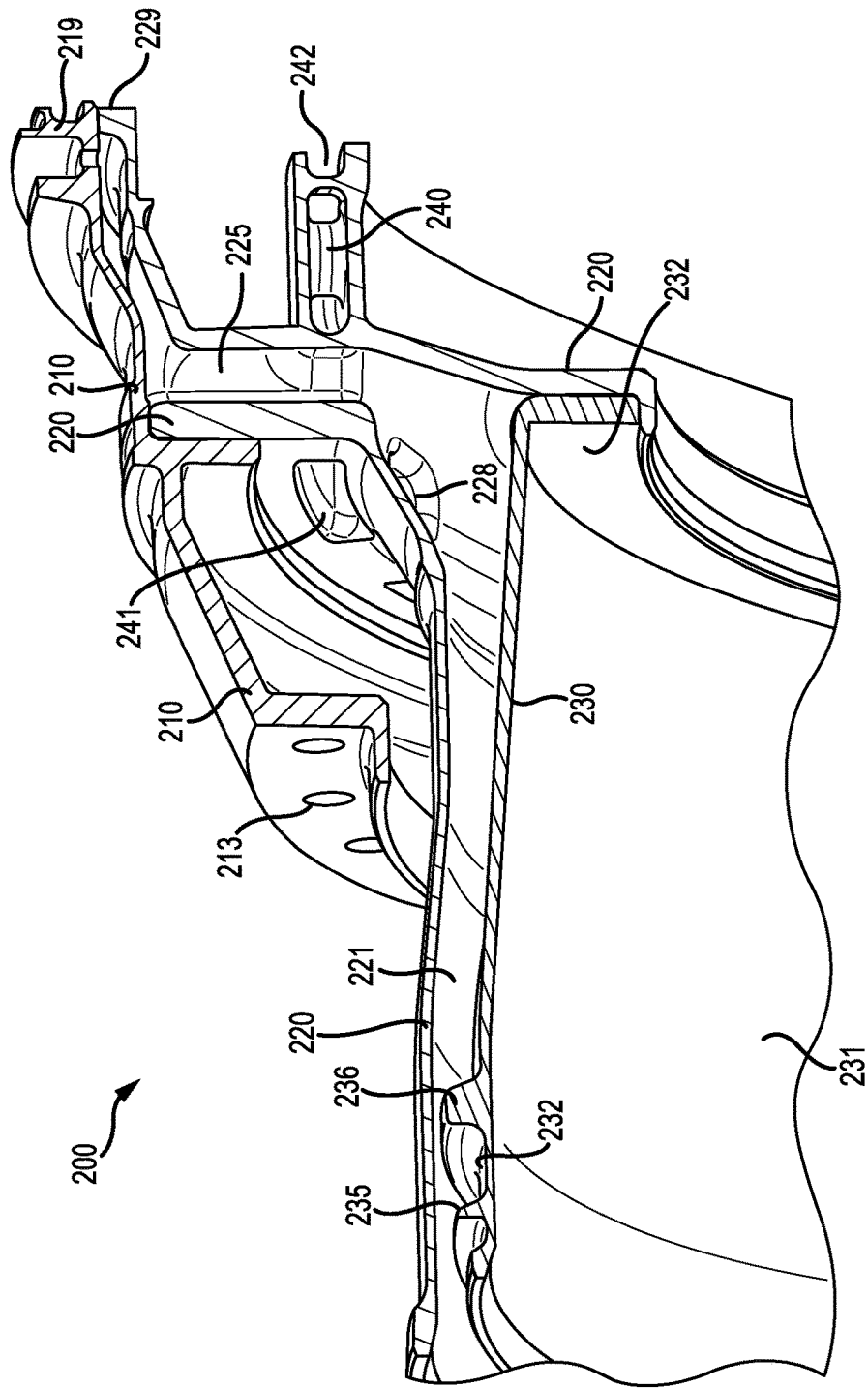
FIG. 3 illustrates a perspective cross-section view of a cooling system, in accordance with various embodiments.

In various embodiments, and with reference to FIGS. 2 and 3, first airflow path E may be defined by inner diffuser case 190, inner vane support 210, and/or a combustor liner 191. First airflow path E may provide a first airflow through cooling system 200. The first airflow may originate from any suitable source in gas turbine engine 120. For example, the first airflow may originate from an airflow used in combustion of the fuel in a combustor section of gas turbine engine 120. The first airflow may flow along first airflow path E to provide cooling air to a first stage vane in gas turbine engine 120.

In various embodiments, second airflow path F may be defined by inner diffuser case 190, inner vane support 210, and/or flow guide 220. Second airflow path F may provide a second airflow through cooling system 200. The second airflow may originate from any suitable source in gas turbine engine 120. For example, the second airflow may originate from a heat exchanger located outside high pressure turbine section 154. The second airflow may flow along second airflow path F, through a turbine onboard injector (TOBI) 240, and through a cover plate 195. Cover plate 195 may control airflow to a rotating blade. By separating air received from the heat exchanger into second airflow path F, cooler air may be sent directly to TOBI 240, instead of being separated to other engine components.

In various embodiments, third airflow path G may be defined by flow guide 220, fastened inner duct 230, and/or inner vane support 210. Third airflow path G may provide a third airflow through cooling system 200. The third airflow may originate from any suitable source in gas turbine engine 120. For example, the third airflow may comprise air received from a compressor section of gas turbine section 120. The third airflow may flow along third airflow path G, through a bypass passage 225 and into a blade rim cavity 193. In that regard, the third airflow may provide high pressure cooling air to purge hotter, lower pressure air from blade rim cavity 193, and to provide cooling air to engine components.

Figure 4A:
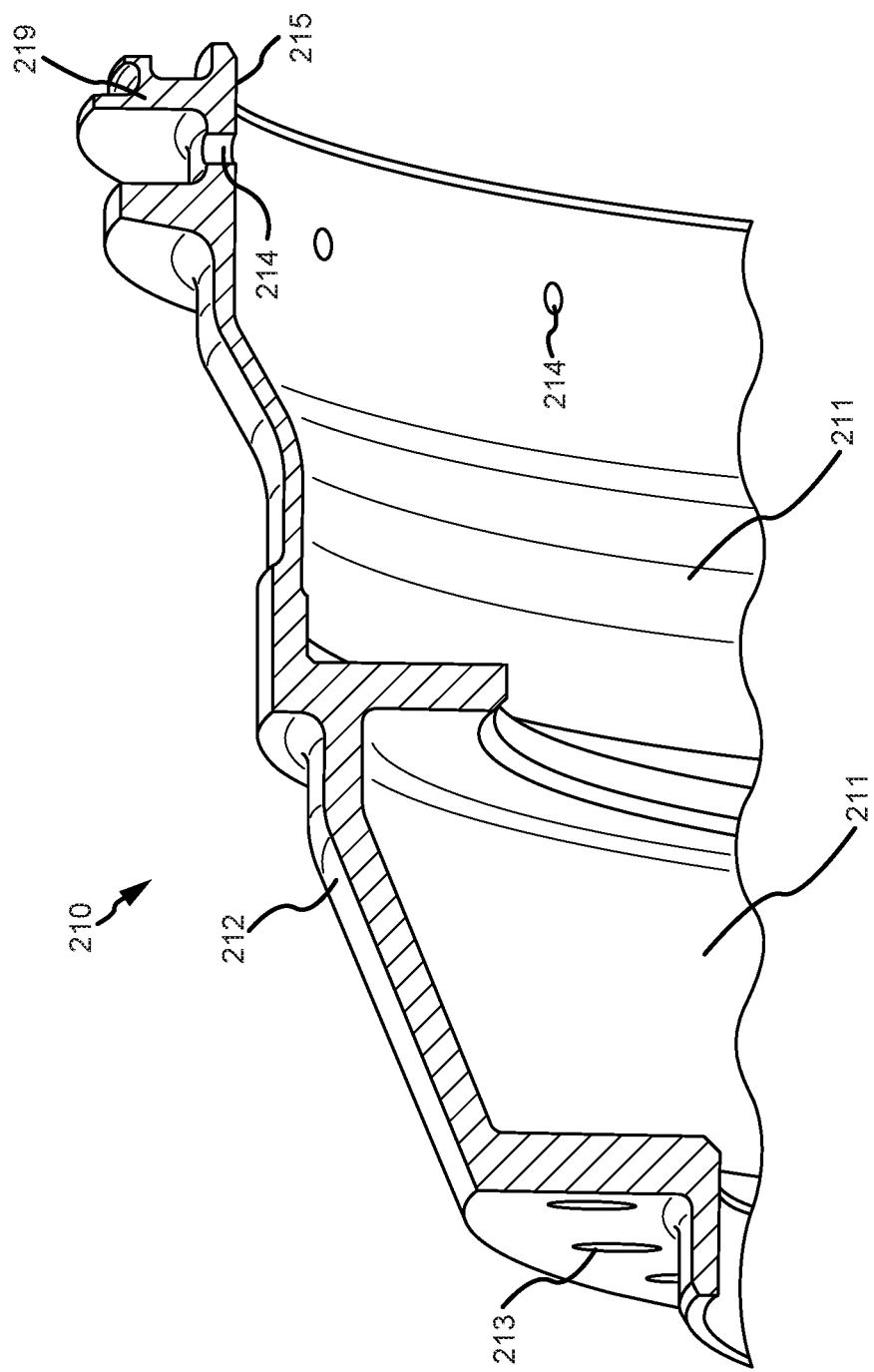
FIG. 4A illustrates a perspective cross-section view of an inner vane support, in accordance with various embodiments.

In various embodiments, and with reference to FIG. 4A, inner vane support 210 is depicted in greater detail. Inner vane support 210 may be configured to direct airflow along first airflow path E and second airflow path F. Inner vane support 210 may comprise a radially inner surface 211 opposite a radially outer surface 212. Radially inner surface 211 may comprise a surface of inner vane support 210 nearest engine central longitudinal axis A-A', relative to radially outer surface 212. Radially inner surface 211 may comprise the surface of inner vane support 210 that partially defines second airflow path F (together with radially outer surface 222 of flow guide 220, with brief reference to FIG. 3). Radially outer surface 212 may comprise the surface of inner vane support 210 that partially defines first airflow path E.

In various embodiments, inner vane support 210 may comprise bolt holes 213 on a forward end of radially outer surface 212. Bolt holes 213 may enable inner vane support 210 to couple at a forward end to inner diffuser case 190 and/or combustor liner 191, such as through the use of a bolt, and/or the like. In various embodiments, inner vane support 210 may also couple to inner diffuser case 190 and/or combustor liner 191 using any other suitable technique.

In various embodiments, inner vane support 210 may also comprise outlet air holes 214. Outlet air holes 214 may enable a discharge of the third airflow towards a stator vane 201 (with brief reference to FIG. 2). Outlet air holes 214 may comprise any suitable shape and/or size. Outlet air holes 214 may be spaced circumferentially around inner vane support 210 (with regard to engine central longitudinal axis A-A'). In that regard, outlet air holes 214 may be spaced evenly, or offset at any suitable and/or desired distance.

In various embodiments, and with reference to FIGS. 4A and 4B, inner vane support 210 may comprise discharge slots 215 located on radially inner surface 211. Discharge slots 215 may be formed by milling, electronic discharge machining, and/or the like. In various embodiments, inner vane support 210 may also be cast to comprise discharge slots 215. Discharge slots 215 may be spaced circumferentially around inner vane support 210 (with regard to engine central longitudinal axis A-A'). With brief reference to FIG. 2, discharge slots 215 may allow the third airflow to flow through outer seal edge 219 and a flow guide seal 229, and into blade rim cavity 193. In various embodiments, discharge slots 215 may be configured to meter the airflow (e.g., restrict the flow of air) into the blade rim cavity 193. In that regard, discharge slots 215 may comprise any shape and/or size based on a desired airflow into blade rim cavity 193. For example, discharge slots 215 may comprise a width of about 0.185 inches (0.47 cm) to about 0.25 inches (0.635 cm), or about 0.25 inches (0.64 cm) to about 0.5 inches (1.27 cm), and/or any other suitable width (wherein about in this context refers only to +/−0.05 inches (0.127 cm).

Figure 5:
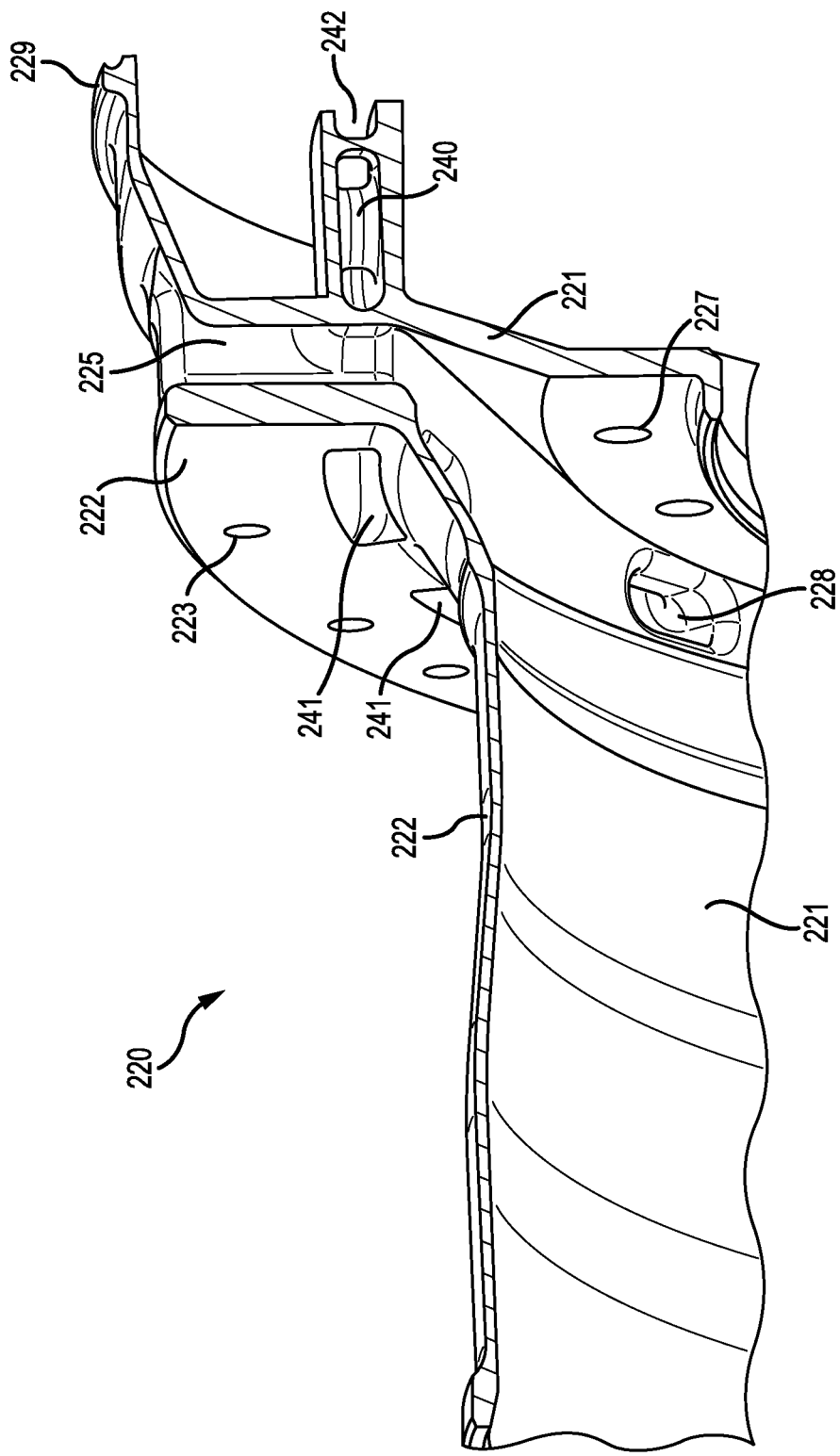
FIG. 5 illustrates a perspective cross-section view of a flow guide, in accordance with various embodiments.

In various embodiments, and with reference to FIG. 5, flow guide 220 is depicted in greater detail. Flow guide 220 may be configured to direct airflow along second airflow path F and third airflow path G. Flow guide 220 may comprise a radially inner surface 221 opposite a radially outer surface 222. Radially inner surface 221 may comprise a surface of flow guide 220 nearest engine central longitudinal axis A-A', relative to radially outer surface 222. Radially inner surface 221 may comprise the surface of flow guide 220 that partially defines second airflow path G (together with radially outer surface 232 of fastened inner duct 230, with brief reference to FIG. 3). Radially outer surface 222 may comprise the surface of flow guide 220 that partially defines third airflow path F (together with radially inner surface 211 of inner vane support 210, with brief reference to FIG. 3).

In various embodiments, flow guide 220 may comprise first bolt holes 223 on an aft end of radially outer surface 222. First bolt holes 223 may enable flow guide 220 to couple to inner vane support 210 (with brief reference to FIG. 3), such as through the use of a bolt, and/or the like. In various embodiments, flow guide 220 may also couple to inner vane support 210 using any other suitable technique. Flow guide 220 may also comprise second bolt holes 227. Second bolt holes 227 may enable flow guide 220 to couple to fastened inner duct 230 (with brief reference to FIG. 3), such as through the use of a bolt, and/or the like. In various embodiments, flow guide 220 may also couple to fastened inner duct 230 using any other suitable technique.

In various embodiments, flow guide 220 may comprise a tangential onboard injector (TOBI 240). TOBI 240 may be configured to receive the second airflow and expel the second airflow towards cover plate 195, with brief reference to FIG. 2, to cool engine components (e.g., blades). TOBI 240 may receive the second airflow from TOBI inlet 241. In that regard, TOBI inlet 241 may be located on radially outer surface 222 and may be bound by radially outer surface 222 and TOBI 240. TOBI 240 may comprise an airfoil, and/or the like, configured to rotate the second airflow circumferentially before expelling the second airflow towards cover plate 195. TOBI 240 may expel the second airflow via a TOBI outlet 242. In various embodiments, TOBI inlet 241 may comprise a greater surface area than TOBI outlet 242 such that the second airflow increases velocity as the second airflow is expelled from TOBI outlet 242.

In various embodiments, flow guide 220 may also comprise an air bypass passage 225. Air bypass passage 225 may be configured to allow the third airflow to flow through flow guide 220 and into blade rim cavity 193 (with brief reference to FIG. 2). Air bypass passage 225 may be located on radially inner surface 221 of flow guide 220, and may be bounded by radially inner surface 221 and radially outer surface 222. Air bypass passage 225 may be formed by milling, electronic discharge machining, and/or the like. In various embodiments, flow guide 220 may also be cast to comprise air bypass passage 225. Air bypass passages 225 may be spaced circumferentially around flow guide 220 (with regard to engine central longitudinal axis A-A'). Air bypass passage 225 may be circumferentially spaced evenly, offset, and/or at any suitable and/or desired distance. Air bypass passage 225 may comprise any suitable shape and/or size to allow for the flow of third airflow.

In various embodiments, and with reference again to FIG. 3, fastened inner duct 230 may be configured to direct airflow along third airflow path G. Fastened inner duct 230 may comprise any suitable shape and/or size capable of directing airflow. Fastened inner duct may comprise a radially inner surface 231 opposite a radially outer surface 232. Radially inner surface 231 may comprise a surface of fastened inner duct 230 nearest engine central longitudinal axis A-A', relative to radially outer surface 232. Radially outer surface 232 may comprise the surface of fastened inner duct 230 that partially defines third airflow path G (together with radially inner surface 221 of flow guide 220).

In various embodiments, fastened inner duct 230 may comprise a stopping rib 235. Stopping rib 235 may be located on a forward edge of radially outer surface 232 of fastened inner duct 230, and may extend in a full circumferential direction around fastened inner duct 230 (with regard to engine central longitudinal axis A-A'), or a multiple standoffs or tabs. In various embodiments, stopping rib 235 may also comprise multiple standoffs or tabs dispersed in a circumferential direction around fastened inner duct 230. Stopping rib 235 may be configured as a stopping feature during installation of cooling system 200 into gas turbine engine 120, to prevent fastened inner duct 230 from being moved into an incorrect position. For example, cooling system 200 may be installed in an area of high pressure turbine section 154 having multiple engine components, and high tolerances, such that only a low volume area is available for the installation of cooling system 200. In that regard, stopping rib 235 may act as a stopping feature so that cooling system 200 is installed into a correct position in high pressure turbine section 154 (as depicted in FIG. 2).

In various embodiments, fastened inner duct 230 may also comprise a stiffening rib 236. Stiffening rib 236 may be located on forward radially outer surface 232, aft of stopping rib 235, of fastened inner duct 230 and may extend in a full circumferential direction around fastened inner duct 230 (with regard to engine central longitudinal axis A-A'). Stiffening rib 236 may be configured to add additional support and stiffness to fastened inner duct 230. For example, stiffening rib 236 may be used to add support against buckling caused by forces in the radial and/or axial directions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cooling system, comprising:
an inner vane support comprising a first surface radially opposite a radially inner surface, the radially inner surface facing radially inward;
a flow guide coupled to the radially inner surface of the inner vane support, wherein the flow guide comprises an outer surface radially opposite an inner surface;
a fastened inner duct coupled to the inner surface of the flow guide, wherein the fastened inner duct comprises a third surface radially opposite a fourth surface; and
a plurality of discharge slots, each discharge slot being defined by a radial recess on the radially inner surface of the inner vane support, the plurality of discharge slots being spaced circumferentially around the inner vane support,
wherein the first surface of the inner vane support partially defines a first airflow path through the cooling system,
wherein the radially inner surface of the inner vane support and the outer surface of the flow guide define a second airflow path through the cooling system,
wherein the inner surface of the flow guide and the third surface of the fastened inner duct define a third airflow path through the cooling system, and
wherein the plurality of discharge slots are configured to meter an airflow from the third airflow path into a blade rim cavity.

2. The cooling system of claim 1, further comprising a bypass passage located on the inner surface of the flow guide, wherein the bypass passage is bounded by the outer surface and the inner surface of the flow guide and is configured to receive a third airflow from the third airflow path.

3. The cooling system of claim 1, further comprising a tangential onboard injector (TOBI) located at an aft end of the flow guide, wherein the TOBI is configured to receive a second airflow from the second airflow path.

4. The cooling system of claim 3, wherein the flow guide comprises a TOBI inlet on the outer surface forward of the TOBI, the TOBI inlet being configured to enable the second airflow to flow through the TOBI, wherein the TOBI inlet is bounded by the outer surface and the TOBI.

5. The cooling system of claim 1, further comprising a stopping rib located on the third surface of the fastened inner duct.

6. The cooling system of claim 5, further comprising a stiffening rib located on the third surface of the fastened inner duct, aft of the stopping rib.

7. A gas turbine engine, comprising:
a compressor;
a combustor in fluid communication with the compressor;
a turbine in fluid communication with the combustor;
a diffuser around the combustor; and
a cooling system coupled to an inner diffuser case of the diffuser, the cooling system comprising:
an inner vane support comprising a first surface radially opposite a radially inner surface, the radially inner surface facing radially inward;
a flow guide coupled to the radially inner surface of the inner vane support, wherein the flow guide comprises an outer surface radially opposite an inner surface;
a fastened inner duct coupled to the inner surface of the flow guide, wherein the fastened inner duct comprises a third surface radially opposite a fourth surface; and
a plurality of discharge slots, each discharge slot being defined by a radial recess on the radially inner surface of the inner vane support, the plurality of discharge slots being spaced circumferentially around the inner vane support,
wherein the first surface of the inner vane support partially defines a first airflow path through the cooling system,
wherein the radially inner surface of the inner vane support and the outer surface of the flow guide define a second airflow path through the cooling system,
wherein the inner surface of the flow guide and the third surface of the fastened inner duct define a third airflow path through the cooling system, and
wherein the plurality of discharge slots are configured to meter an airflow from the third airflow path into a blade rim cavity.

8. The gas turbine engine of claim 7, further comprising a bypass passage located on the inner surface of the flow guide, wherein the bypass passage is bounded by the outer surface and the inner surface of the flow guide and is configured to receive a third airflow from the third airflow path.

9. The gas turbine engine of claim 7, further comprising a TOBI located at an aft end of the flow guide, wherein the TOBI is configured to receive a second airflow from the second airflow path.

10. The gas turbine engine of claim 9, wherein the flow guide comprises a TOBI inlet on the outer surface forward of the TOBI, the TOBI inlet being configured to enable the second airflow to flow through the TOBI, wherein the TOBI inlet is bounded by the outer surface and the TOBI.

11. The gas turbine engine of claim 7, further comprising a stopping rib located on the third surface of the fastened inner duct.

12. The gas turbine engine of claim 11, further comprising a stiffening rib located on the third surface of the fastened inner duct, aft of the stopping rib.

13. A diffuser, comprising:
an inner diffuser case; and
a cooling system coupled to the inner diffuser case, the cooling system comprising:
   an inner vane support comprising a first surface radially opposite a radially inner surface, the radially inner surface facing radially inward;
   a flow guide coupled to the radially inner surface of the inner vane support, wherein the flow guide comprises an outer surface radially opposite an inner surface;
   a fastened inner duct coupled to the inner surface of the flow guide, wherein the fastened inner duct comprises a third surface radially opposite a fourth surface; and
   a plurality of discharge slots, each discharge slot being defined by a radial recess on the radially inner surface of the inner vane support, the plurality of discharge slots being spaced circumferentially around the inner vane support,
      wherein the first surface of the inner vane support partially defines a first airflow path through the cooling system,
      wherein the radially inner surface of the inner vane support and the outer surface of the flow guide define a second airflow path through the cooling system,
      wherein the inner surface of the flow guide and the third surface of the fastened inner duct define a third airflow path through the cooling system, and
      wherein the plurality of discharge slots are configured to meter an airflow from the third airflow path into a blade rim cavity.

14. The diffuser of claim 13, further comprising a bypass passage located on the inner surface of the flow guide, wherein the bypass passage is bounded by the outer surface and the inner surface of the flow guide and is configured to receive a third airflow from the third airflow path.

15. The diffuser of claim 13, further comprising a TOBI located at an aft end of the flow guide, wherein the TOBI is configured to receive a second airflow from the second airflow path.

16. The diffuser of claim 15, wherein the flow guide comprises a TOBI inlet on the outer surface forward of the TOBI, the TOBI inlet being configured to enable the second airflow to flow through the TOBI, wherein the TOBI inlet is bounded by the outer surface and the TOBI.

17. The diffuser of claim 13, further comprising a stopping rib located on the third surface of the fastened inner duct.

* * * * *